Sept. 3, 1935.  H. W. ZIMMERMAN  2,013,373
CONNECTING ROD ALIGNMENT GAUGE
Filed April 30, 1931  2 Sheets-Sheet 1
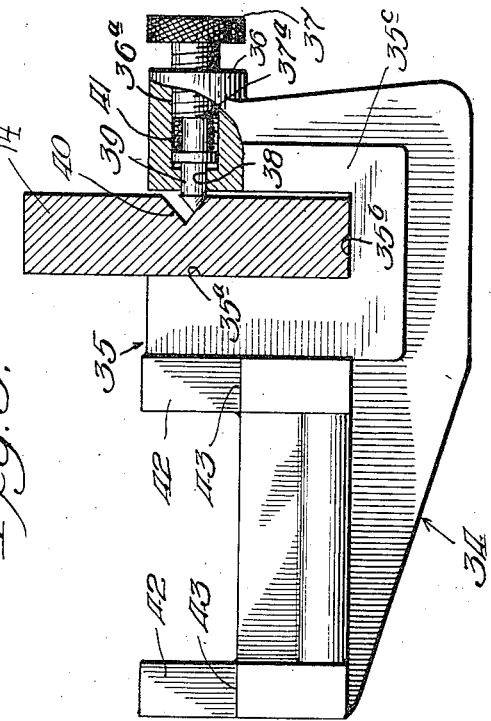
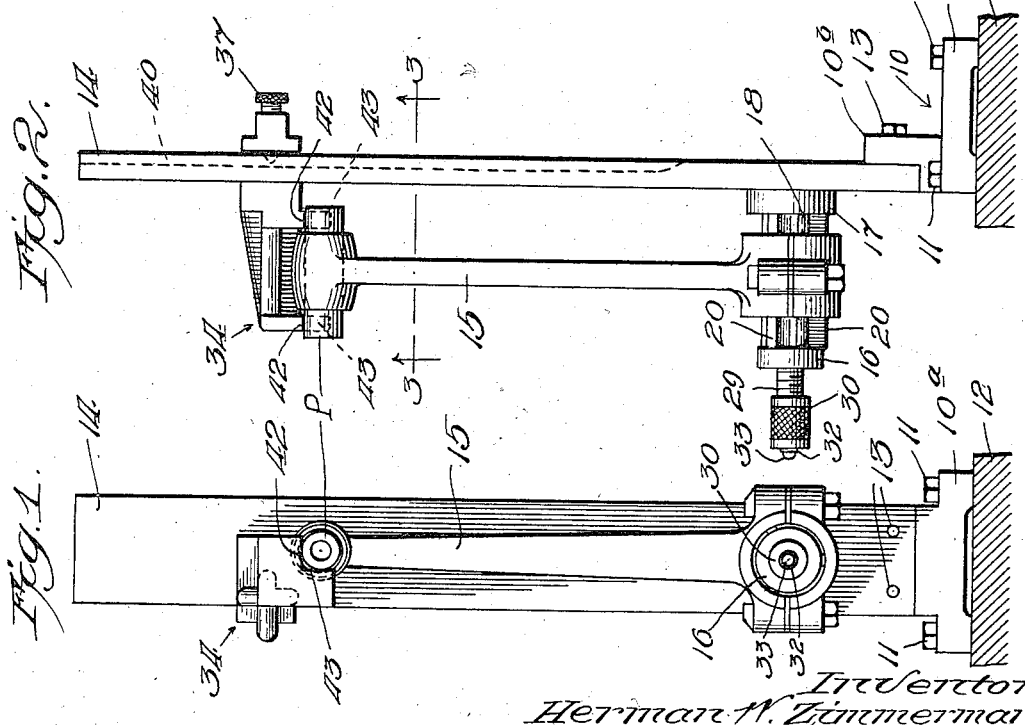
Inventor:
Herman W. Zimmerman
by Rector, Hibben, Davis & Macauley
Attys.

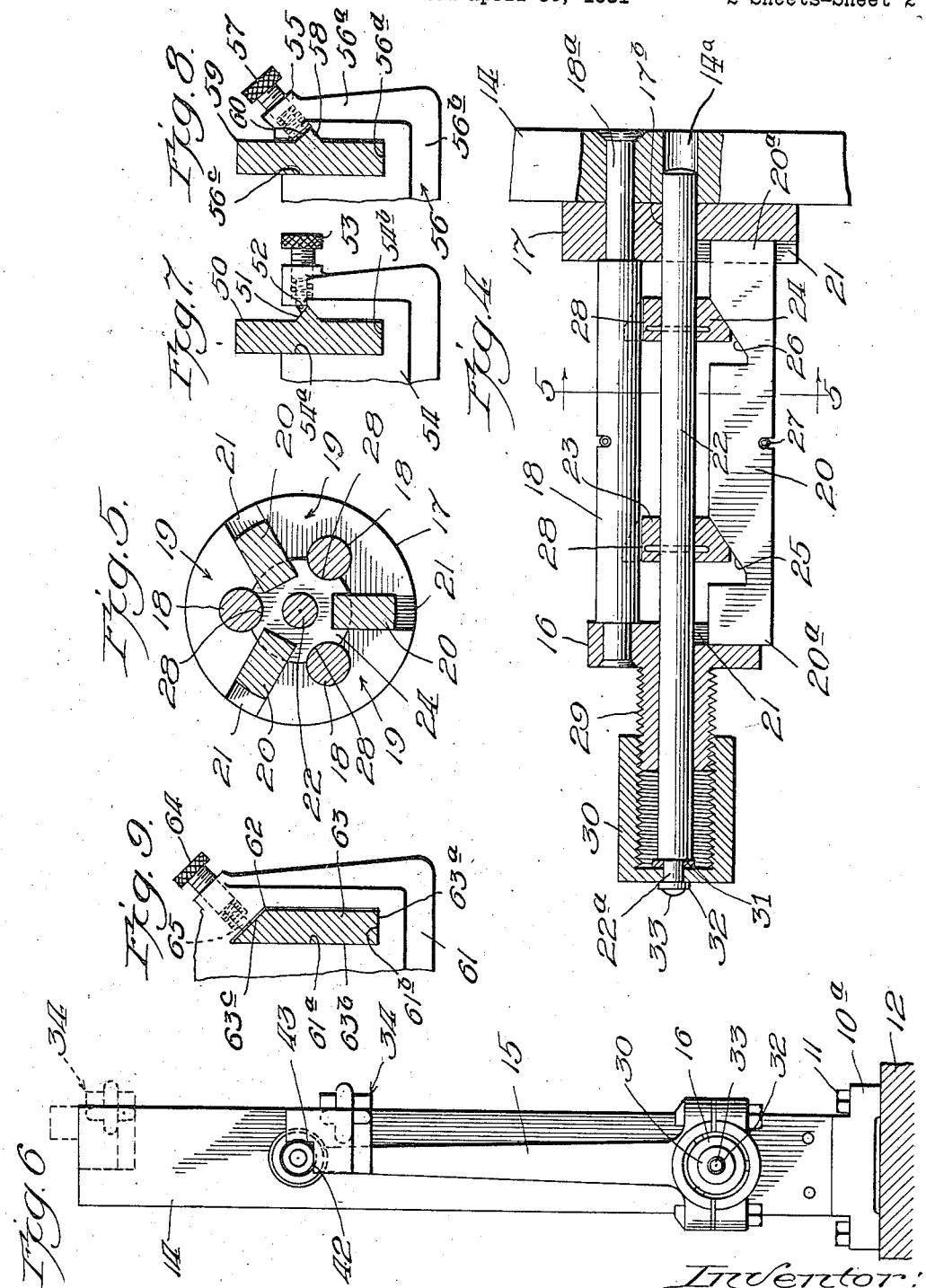
Sept. 3, 1935. H. W. ZIMMERMAN 2,013,373
CONNECTING ROD ALIGNMENT GAUGE
Filed April 30, 1931 2 Sheets-Sheet 2

Patented Sept. 3, 1935

2,013,373

UNITED STATES PATENT OFFICE 2,013,373

CONNECTING ROD ALIGNMENT GAUGE

Herman W. Zimmerman, Chicago, Ill., assignor to Automotive Maintenance Machinery Co., Chicago, Ill., a corporation of Illinois Application April 30, 1931, Serial No. 533,891

21 Claims. (Cl. 33—180)

My invention relates to a tool for gauging connecting rods of various kinds to determine whether the same are out of alignment, and it has to do more particularly with means for supporting the connecting rod for the gauging operation, and also the arrangement of the gauging surfaces and their supports.

One of the objects of my invention is to provide a gauge of this character which is not only simple in construction and cheap to manufacture, but is always quite accurate in gauging different size connecting rods.

Another object is to provide a novel support for holding the connecting rod in gauging position, which support is readily and quickly adjustable to a large range of different size connecting rod bearings.

A further object is to provide a tool of this character embodying a gauge member adjustable along its supporting surface toward and from the connecting rod support and which is reversible with respect to its supporting surface for varying the effective gauging lengths of the tool.

An additional object is to provide a novel form of clamp means for securing the gauge member to its supporting surface, which clamp means is adapted to secure such member in substantially the same predetermined gauging position with respect to its support in all of its adjusted positions so that an accurate gauging action is always accomplished as between the connecting rod support and the gauging member.

Other objects and advantages will become apparent as this description progresses and by reference to the drawings wherein,—

Figure 1 is a front elevational view of one form of tool embodying my invention;

Fig. 2 is a side view of the structure shown in Fig. 1;

Fig. 3 is an enlarged section taken substantially on line 3—3 of Fig. 2, but with the connecting rod removed;

Fig. 4 is a longitudinal sectional view of the adjustable connecting rod support;

Fig. 5 is a section taken substantially on line 5—5 of Fig. 4;

Fig. 6 is a view similar to Fig. 1, but showing the gauging member reversed. The gauging member is shown in full lines in gauging position with respect to one size or length connecting rod, and is shown in dotted lines in gauging relation with respect to another size or length connecting rod; and Figs. 7, 8, and 9 are reduced sectional views taken at substantially the same position as Fig. 3, but showing modified forms of gauging member mountings.

Referring particularly to the form of tool which I have chosen to illustrate my invention, it comprises a right-angled base member 10 having its horizontal web 10ª adapted to be secured (as by screw bolts 11) to a supporting surface 12. Its vertical leg 10ᵇ has secured thereto (as by bolts 13) a rectangularly-shaped and vertically-disposed plate 14 which is finished to uniform rectangular dimensions throughout. While this form of mounting well serves my purpose, the plate 14 may in certain instances be mounted in horizontal position without departing from my invention.

The connecting rod 15, which is of conventional form, is supported at its crank-shaft end by the adjustable structure shown most clearly in Figs. 2, 4 and 5. Heretofore, it has been customary in devices of this character to employ a plurality of fixed-size arbors, bushings, or like supports, for this purpose, one for each size of connecting rod bearing within the gauging range of the tool. Thus, tools of this latter character are, obviously, quite expensive and require considerable time and expense in adjusting the same to the particular rod to be gauged. In carrying out my invention, I provide a support which is readily and quickly adjustable to a great number of different size connecting rods, one support only being required per tool, specifically, this support (Figs. 4 and 5) takes the form of a cage-like body having end plates 16, 17 rigidly secured together in spaced relation by a plurality of spaced posts 18 forming radial passageways 19 in which there are adjustably disposed, for radial expansion or contraction movements, a plurality of members 20. These members have end-tongue extensions 20ª which ride in slots 21 in the opposing faces of the end plates 16, 17 and in that manner the members 20 receive support and guidance. To expand these members 20, I provide a center stem 22 rigidly supporting cone-spreaders 23, 24 which engage complementally-shaped surfaces 25, 26, respectively, along the inner edges of the members 20, wherefore, as the stem and cone-spreaders 23, 24 are moved axially and inwardly of the tool, the members 20 are expanded, and, as such stem is moved in the opposite direction, the action of the spring ring 27, which is disposed centrally of the members 20 in suitable grooves, contracts the members 20. This spring ring holds the members 20 seated against the tapered surface of the cone spreaders 23, 24 at all times. To prevent rotation of the stem member 22 and its cone spreaders, the latter are notched as at 28 to receive the adjacent surface of the posts 18. This structure also serves to strengthen the tool as a whole and render it quite rigid in the performance of its supporting function. This further facilitates reduction in the minimum working diameter of the tool.

To effect the adjustment of the stem 22, I extend the end plate 16 in tubular fashion as at 29 and externally thread the same to adjustably receive an inverted, internally-threaded cap member 30. This cap member is rotatably secured to the stem 22 as follows: The outer end stem 22ᵃ of the stem is reduced and, upon its reduced end, there is seated a washer 31. The end of the cap 30 is provided with an opening through which the stem end 22ᵃ passes to seat the cap upon the washer, whereupon a suitable washer 32 is passed over the stem end 22ᵃ and the stem is upset as at 33 to securely fasten the parts together.

It will be appreciated that the end plate 16 must be of sufficiently small dimensions to permit the smallest size connecting rod bearing, for which the particular tool is designed, to be readily slipped over such plate. At the same time a wide range of adjustment of the members 20 is necessary to accommodate the tool to any desired range of connecting rod sizes. In reducing the size of the end plate 16, support for the members 20 is reduced at that end; however, to compensate for that and to provide a rigid support for the member 20 throughout their range of expansion adjustment, I enlarge the end plate 17 providing grooves 21 therein which are long enough to give complete support to members 20 in their fully expanded position. With such an arrangement a rigid connecting rod support is provided, which always maintains the supported connecting rod bearing in the same predetermined position, notwithstanding the position which the connecting rod may assume on its support, or wear of the parts. Further, for accurate gauging operation, it is essential that the connecting rod holder be held at all times with its axis in an exact right-angular relationship with respect to the face of the upright plate 14. The enlarged end plate 17 insures that relationship, reducing to a minimum the possibility of any deflection action such as might be caused by movement of the connecting rod.

The enlarged end plate 17 is seated against the upright plate 14; and to further maintain the desired rigid relationship as between the support and plate, I utilize the posts 18 as the means for securing the connecting rod carrier to the plate; that is, the ends of these posts which project into the end plate 17 are extended as at 18ᵃ into and are secured in the plate 14 in any desired manner such as upsetting their ends, etc. Although the foregoing arrangement is preferable, the end plate may be secured in position by suitable screws, bolts or the like passing through, or into the end plate 17 and plate 14. The end plate 17 gives axial guidance to the stem 22 by means of an opening 17ᵇ therein, and an opening 14ᵃ in the plate 14 aligns with this opening for completion of this axial support. Also, in certain instances, if desired, the end plate 17 may be of the same (or other suitable) size as the opposite end plate 16.

To test for out-of-alignment, I may employ the form of gauge carriage or member 34 shown in Figs. 1, 2, 3, 5, and 6, which gauge member is mounted upon and adjustable longitudinally of the plate 14 toward and from the connecting rod carrier. This carriage member is provided with a U-shaped clamp base portion (Fig. 3) 35 having its leg and base surfaces 35ᵃ and 35ᵇ, respectively, finished at right angles to each other; and the surface 35ᵃ is in a plane parallel with the plane of the adjacent face of the plate 14 and its surface 35ᵇ is in a plane parallel with the plane of the adjacent edge of the plate 14 (or is in a plane disposed at right angles to the plane of the face of the plate 14). The leg 35ᶜ of the portion 35 is provided with a boss 36 which supports adjustable clamp means. More particularly, this clamp means comprises an adjusting screw 37 which adjustably engages a threaded bore 36ᵃ extending with uniform diameter partway through the boss 36. The inner portion of the boss, adjacent the plate 14, is provided with a reduced opening 38 leading into the larger bore 36ᵃ. The opening 38 slidably receives a clamp pin 39 having its point-end engageable with the taper of the V-groove 40 arranged centrally and longitudinally in the back of the plate 14. The inner end of the pin 39 is provided with an enlarged head to seat against the inner end of the screw-bore 36ᵃ to limit the movement of the pin toward the plate 14. The inner end of the screw 37 is reduced to provide a shoulder 37ᵃ between which and the enlarged head of the pin 39 there is mounted a spring 41 which is, normally, under compression so as to tensionally seat the end of the pin 39 against the V-wall of the plate groove 40. With this arrangement, the screw 37 can be rotated to adjust and tighten the pin 39 in the plate groove without rotating the pin and causing displacement of the gauge along the plate away from its predetermined set position. Furthermore, with this arrangement the tension of the spring is sufficient to hold the pin 39 yieldably seated in the plate groove; so that, even when the screw 37 is loosened somewhat to permit the carriage 34 to be slid up and down along the plate 14, the tensional clamp will hold the carriage in any position to which it is moved. When it is desired to tightly lock the gauge carriage in an adjusted position for gauging a connecting rod the screw 37 is turned inwardly until its inner end engages the head of the pin 39 so as to rigidly clamp and lock the latter in the plate groove.

It will be noted that, in the form shown in Figs. 1-6, the taper of the plate groove is longer than that at the end of the pin 39 and that the center of the pin is disposed eccentrically with respect to the center of the groove; wherefore, the taper end of the pin engages the outer portion of the tapered wall of the groove with the end of the pin offset from the bottom of the groove. Consequently, as the screw 37 is tightened in place, the engagement between the pin 39 and the groove 40 exerts a lateral as well as axial (with respect to the pin 39) thrust on the carriage so as to positively move (and hold) the carriage surfaces 35ᵃ and 35ᵇ into firm seated relation with the adjacent face and edge surfaces of the plate 14. This same predetermined positioning of the gauge carriage 35 is accomplished at all positions along the plate 14.

The gauge carriage 34 is provided with a pair of sets of finished gauging surfaces 42, 43; the surfaces of each set being disposed in planes at right angles to each other and in planes at right angles to the face of the plate 14. Also the planes of these right angled surfaces are parallel with the axis of the adjustable connecting rod support hereinabove described; wherefore when the pin-end of the connecting rod is swung around so that the pin P carried thereby approaches these gauging surfaces 42, 43, all of such surfaces will evenly engage the pin if the connecting rod is not out-of-alignment. If it is out of alignment (twisted, bent, etc.) the manner and extent of out-of-alignment will be indicated by the relation of the pin surfaces to the right-angled gauging surfaces 42, 43 as will be readily appreciated.

Obviously, the adjustment of the carriage 34 insures proper gauging of various length connecting rods. With the carriage 34 mounted in the position shown in Figs. 1 and 2 (gauging surfaces 42, 43 facing toward the connecting rod support), its connecting rod length range is less than the distance between the axis of the connecting rod support and the end of the plate 14. According to my invention, this range may be increased as follows: The groove 40 in the back of the plate 14 is centrally arranged and it extends to the upper end of the plate, so that the carriage may be slid off the end of the plate 14 and reversed with the surfaces 42 and 43 facing away from the connecting rod support, but bearing the same identical relationship to the adjacent surfaces of the plate 14 as hereinabove described. When the carriage is reversed and it is moved to the upper end of the plate, as shown in dotted lines in Fig. 6, the length-range of the tool is increased. As further illustrated in Fig. 6, shorter connecting rods may be gauged with the carriage in this position; but it is to be understood that in both the positions of Figs. 1, 2 and 6 the above-described, predetermined gauging relationship between the carriage and plate 14 is maintained and the same adjustability of the carriage exists due to the central position of the groove 40. The above clamp means, also, functions similarly in both positions of the gauge carriage.

Now referring to the modified forms of carriage mounts, that shown in Fig. 7 is substantially the same as that of Fig. 3 except that the plate 50 is provided on its rear face with a centrally-disposed rib 51 which is V-shaped in cross section. The taper-pointed end of the clamp pin 52 engages the taper side of the V-rib 51 so that, as the adjusting screw 53 is adjusted inwardly and the end of pin 52 is forced downwardly along the rib surface, the seating surfaces 54ᵃ and 54ᵇ of the carriage 54 are forced into and held in firm seated position on the respective face and side edge surfaces of the plate 50. Otherwise, construction and operation of this form of mount is the same as that of Fig. 3.

The form of mount shown in Fig. 8 is substantially the same as that of Fig. 7 except as follows: The boss 56ᵃ at the end of the leg 56ᵃ of the U-base part 56ᵇ of the carriage member 56 is turned inwardly to such an extent that the axis of the adjusting screw 57 carried thereby is at substantially right angles to the tapered side wall of the V-rib 58 on the back of the plate 59. In this form the end of the clamp pin 60 is, preferably, blunt. Obviously, as the adjusting screw 57 is tightened, the carriage surfaces 56ᶜ and 56ᵈ are forced into and held in firm seated position against the respective face and side edge of the plate 59.

In the form of Fig. 9, the carriage base part 61 takes a closed formation having an opening 62 through which the plate 63 (corresponding to plate 14 of Fig. 1) passes. The plate 63 has one edge 63ᵃ formed at right angles to its face 63ᵇ while its other side edge 63ᶜ is beveled. The adjusting screw 64 and clamp pin 65 are supported by the base part adjacent the beveled plate edge 63ᶜ with their axes extending substantially at right angles to the beveled edge 63ᶜ. When the adjusting screw 64 is tightened, the carriage surfaces 61ᵃ and 61ᵇ are forced into and held in firm seated engagement with the face 63ᵇ and edge 63ᵃ of the plate 63. Otherwise, the construction and operation of this form is the same as the forms of Figs. 3, 7 and 8.

In certain instances, it may be desirable to gauge a piston and connecting rod assembly before or after alignment conditions have been determined. In that case, the carriage is removed from the plate 14, the rod is mounted on its support as above described, and the piston rod assembly is swung around to bring the piston alongside the plate 14. In that case, the face of the plate 14 serves as a gauging surface.

While I have shown several forms of structure embodying my invention, it is to be understood that other changes in details and arrangement of parts may be made without departing from the spirit and scope of my invention as defined by the claims which follow.

I claim:

1. In a tool of the character described, a support plate, and a connecting rod support mounted on said plate comprising a body having a pair of end members rigidly connected in such a way as to provide longitudinally extending passageways, said end members having radial grooves aligned with said radial passageways, support elements mounted in said passageways and having end portions guidingly supported in said grooves for radial expansion or contraction movement, means for expanding or contracting said elements, one of said end members being adapted to seat against said plate and being enlarged, and means for securing said latter end member to said plate with the axis of said body at right angles to the attached face of said plate.

2. In a tool of the class described, a plate having an attaching face, and an adjustable connecting rod support having its axis at right angles to the attaching face of said plate, said support comprising a body having a pair of end plates rigidly connected together in spaced relation, a plurality of spaced bars connecting said plates and dividing the space therebetween into a plurality of radial passageways, members mounted in said passageways and expansible to engage the supported portion of the connecting rod, means for expanding said members, said bars being extended through one of said end plates and engaging said plate to secure said latter end plate flush against said plate.

3. In a tool of the class described, a base plate, and a connecting rod support mounted on said plate and comprising a body of cage-like form having a pair of end plates, a plurality of bars secured to said end plates for holding the latter in spaced relation and for forming radial passageways, members mounted in said passageways and expansible to engage the supported part of said connecting rod and hold said supported part concentric with the axis of said body, said members being supported by said end plates, means for expanding said members, and means for securing one of said end plates to said base plate with the axis of said body at right angles to the supporting surface of said plate.

4. In a tool of the class described, a connecting rod support which comprises a pair of end plates, a plurality of independent posts by which said end plates are rigidly joined together in spaced relation, said posts forming radial passageways, expansible members mounted in said passageways, said members having their ends slidingly interlocked with said end plates, a center stem movably mounted in said end plates, cone spreaders supported by said stem for axial movement as said stem is moved, said spreaders having non-detached engagement with said members for contraction and expansion movements of the latter, said cone-spreaders being engaged with said posts to prevent rotation of the former and for adding rigidity to said connecting rod support as a whole, and an adjusting member associated with one of said end plates and said stem for effecting movement of the latter.

5. In a tool of the class described, a face plate member, an adjustable and rigid support for the crank shaft bearing end of a connecting rod, said support being secured to said plate member with its axis at right angles to the face of said plate, a gauge carriage member mounted on said plate for movement toward and from said support, said carriage member having a pair of right angled gauging surfaces each in a plane parallel with the axis of said support, one of said members having a groove therein, and means for securing said carriage in various positions of adjustment along said plate, said means including yieldable guide-clamp means engaging in said groove.

6. In a tool of the class described, a face plate member, a connecting rod support secured to said plate member with its axis at right angles to the face of the latter, a gauge carriage member mounted on said plate for movement toward and from said support, said carriage member having a pair of right angled gauging surfaces each in a plane parallel with the axis of said support, said plate member having a longitudinally-extending groove, and means for securing said carriage member in various positions of adjustment along said plate member, said means comprising a U-shaped base part adapted to embrace said plate along one side edge, and an adjustable clamp element carried by said U-shaped base part and engageable in said groove when said base part is embracing the side of said plate.

7. In a tool of the class described, a face plate having a free end, means carried by said plate for supporting the connecting rod, and gauging means adjustably supported by said plate for movement toward and from said support means comprising a member having gauging surfaces at right angles to each other and in planes at right angles to the plane of said plate, said member also having a base part adapted to slidably embrace said plate along one of its sides, said plate having a longitudinal guide element extending substantially throughout the length of said plate and to its free end, and tensioned clamp means carried by said base part and engaging said guide element in all positions of said member to lock said member in any predetermined position of adjustment.

8. In a tool of the class described, a face plate, means carried by said plate for supporting the connecting rod, a gauge member adjustably carried by said plate, and means for securing said gauge member in various positions of adjustment along said plate including a guide element on said plate, a guide engaging member carried by said gauge member and engageable with said guide element, an adjusting screw carried by said guide engaging member, a spring between said screw and said guide-engaging member, normally under compression, for tensioning the engagement between said guide-engaging member and said guide element to support said gauging member normally, against unintentional movement between clamp-adjustments of said screw, said screw being adjustable to clamp said guide-engaging member and said guide element against relative movement.

9. In a tool of the class described, a face plate, means carried by said plate for supporting the connecting rod, a gauge member adjustably carried by said plate, and means for securing said gauge member in various positions of adjustment along said plate comprising a base part embracing said plate along one side, said plate having a longitudinal groove, a yieldably supported member carried by said base part and engageable in said groove for sliding movement therealong, said member normally supporting said gauge member during adjustments, and adjustable means carried by said base part and acting on said groove-engaged member to tighten the latter in said groove to hold said gauge member in a fixed adjusted position.

10. In a tool of the class described, a rectangular supporting plate having its face and side edge finished, a connecting rod support carried by said plate at right angles to the face of the latter, a gauge member adjustably mounted on said plate and having a pair of right angled gauging surfaces, and means for mounting said member on said plate comprising a base part attached to said member and having right angled surfaces in planes parallel, respectively, with the finished face and side edge of said plate, and means, including a V-groove in said plate, an eccentric taper-pointed element on said base part and means for adjusting said element into said groove, for clamping said base part to said plate with the right-angled surfaces of said base part seated against the finished face and side of said plate.

11. In a tool of the character described, a plate, a cylindrical connecting rod support mounted on said plate with its axis at right angles to said plate comprising a body having radially adjustable elements for cooperation with crank shaft bearing of the connecting rod, said body having end walls of different areas, the end wall adjacent the plate having an area greater than the other end wall, and means for rigidly securing said end walls together and the larger end wall directly to said plate for maintaining said right angular relationship.

12. In a tool of the character described, a plate, a connecting rod support mounted on said plate over which the usual crankshaft bearing is passed, said support comprising a cage-like body having end members with grooves therein, expansible-and-contractible support elements having their ends slidably mounted in said grooves, one of said end members being secured to said plate and being of such enlarged dimension as to provide grooves of a length to fully support said elements throughout their entire range of expansion adjustment, the other of said end members being reduced to dimensions sufficient to permit the smallest sized connecting rod to be mounted thereon by passing its bearing thereover.

13. In a tool of the character described, a plate, a connecting rod support mounted on said plate comprising a cage-like body having radially expansible elements to engage and carry the bearing at one end of the connecting rod, said body having end walls, the end wall adjacent said plate having an area sufficient to fully support the expanding elements in their fully expanded position, the other end wall having an area less than the first mentioned wall to permit the smallest size connecting rod bearing to which the particular tool is suited to be passed thereover, and a gauging element slidably mounted on said plate and adjustable thereon toward and from said support and relatively to the free end of the connecting rod.

14. In a tool of the character described, a plate, a support mounted on said plate for carrying one end of a connecting rod, a gauging member having a pair of right angled gauging surfaces to cooperate with the other end of the connecting rod, said gauging member having also a pair of right angled seating surfaces engageable with the right angled face and side edge surfaces of the plate, and adjustable means cooperating with said plate and gauging member for adjustment of said gauging member along said plate and for seating said gauging member seating surfaces flush against said plate face and edge surfaces in any predetermined adjusted position of said gauging member.

15. In a tool of the class described, a plate member adapted for vertical mounting, an adjustable support for a connecting rod bearing carried by said plate with the axis of said support at right angles to the face of said plate, a gauging member carried by said plate and adjustable up and down thereon toward and from said support, said member having a pair of right angled gauging surfaces which lie in planes parallel with the axis of said support, and means adjustable for locking said member in various positions of adjustment, and for holding said member against accidental movement along said plate when not locked.

16. In a tool of the class described, a plate member, a connecting rod support thereon, and a gauge member having right angled gauing surfaces mounted on said plate and adjustable toward and from said support, said gauge member having a pair of surfaces lying in planes, respectively, parallel with the planes of the face and one side edge of said plate and when seated on said plate face and edge surfaces to position said right angled surfaces in proper gauging position relative to said support, and means for clamping said member to said plate which means in all positions of said member positively seats said member surfaces firmly against the face and side edge of said plate.

17. In a tool of the class described, a plate member, a connecting rod support thereon, and a gauge member having right angled gauging surfaces mounted on said plate and adjustable toward and from said support, said gauge member having a pair of surfaces lying in planes, respectively, parallel with the planes of the face and the side edges of said plate and when seated on said plate face and edge surfaces to position said right-angled surfaces in proper gauging position relative to said support, and means for clamping said member to said plate with the right angled surfaces of the latter extending either toward or away from said support, which means in all positions of said member positively seats said member surfaces firmly against the face and side edge of said plate.

18. In a tool of the class described, a supporting plate, a gauging member mounted on said plate for adjustable movement therealong, and means for mounting said member on said plate for such movement which includes a centrally-disposed rib element V-shaped in cross-section and extending longitudinally of the rear side of said plate, a base part on said member embracing one side of said plate and supporting a clamp element having a taper-pointed end engageable with one of the tapered sides of said rib, said element being supported under tension to yieldably engage said rib to normally hold said member against accidental displacement, and means for adjusting said clamp element to rigidly clamp it against said rib to lock said member to said plate.

19. In a tool of the class described, a support plate, a connecting rod support mounted on said plate, a gauge member slidably mounted thereon, and means for clamping said member in position on said plate including a base part on said member embracing one side of said plate, a longitudinally extending rib on the rear face of said plate, and an adjustable clamp element supported by said base part in such a position that inward adjustment thereof effects such engagement with the side of said rib as to force said base part into firm seated engagement with the front face and one side edge of said plate.

20. In a tool of the class described, a support plate, a gauge member slidably mounted thereon, and means for clamping said member in position on said plate including a base part on said member embracing one side of said plate, a longitudinally extending rib substantially V-shaped in cross-section on the rear face of said plate, and an adjustable clamp element supported by said base part in such a position that its axis extends at substantially right angles to one of the V-sides of said rib wherefore inward adjustment thereof effects such engagement with the side of said rib as to force said base part into firm seated engagement with the front face and one side edge of said plate.

21. In a tool of the class described, a support plate, a gauging member, said plate having one side edge beveled and said member having an opening substantially the size and shape of said plate and through which said plate slides, and clamp means for securing said member to said plate in any position of said member along said plate which comprises a clamp element supported by said member adjacent the beveled edge of said plate and extending in a direction at substantially right angles to said beveled edge surface, and means for adjusting said element inwardly toward said beveled edge surface.

HERMAN W. ZIMMERMAN.